(12) United States Patent
Shiozaki et al.

(10) Patent No.: US 7,085,054 B2
(45) Date of Patent: Aug. 1, 2006

(54) DIFFRACTION GRATING ELEMENT

(75) Inventors: Manabu Shiozaki, Osaka (JP);
Masakazu Shigehara, Yokohama (JP)

(73) Assignee: Sumitomo Electric Industries, Ltd., Osaka (JP)

( * ) Notice: Subject to any disclaimer, the term of this patent is extended or adjusted under 35 U.S.C. 154(b) by 0 days.

(21) Appl. No.: 11/147,381

(22) Filed: Jun. 8, 2005

(65) Prior Publication Data

US 2005/0231805 A1 Oct. 20, 2005

Related U.S. Application Data

(63) Continuation of application No. 10/761,433, filed on Jan. 22, 2004.

(60) Provisional application No. 60/461,420, filed on Apr. 10, 2003, provisional application No. 60/442,508, filed on Jan. 27, 2003.

(30) Foreign Application Priority Data

| Jan. 24, 2003 | (JP) | ............................. P2003-016747 |
| Feb. 18, 2003 | (JP) | ............................. P2003-040196 |
| Apr. 9, 2003 | (JP) | ............................. P2003-105678 |

(51) Int. Cl.
*G02B 27/44* (2006.01)

(52) U.S. Cl. ....................... 359/563; 359/569; 359/576

(58) Field of Classification Search ................ 359/569, 359/576, 563; 385/37
See application file for complete search history.

(56) References Cited

U.S. PATENT DOCUMENTS

| 4,993,032 | A | * | 2/1991 | Bradley | ....................... 372/20 |
| 5,260,828 | A |   | 11/1993 | Londono et al. | |
| 6,775,065 | B1 |   | 8/2004 | Hayashi et al. | |
| 2002/0135876 | A1 |   | 9/2002 | Holm et al. | |
| 2003/0076594 | A1 | * | 4/2003 | Kramer | ....................... 359/569 |
| 2003/0146415 | A1 |   | 8/2003 | Minami et al. | |
| 2004/0048076 | A1 |   | 3/2004 | Nakamura et al. | |
| 2004/0170356 | A1 | * | 9/2004 | Iazikov et al. | ................ 385/37 |
| 2004/0190578 | A1 | * | 9/2004 | Partlo et al. | ................ 372/55 |

OTHER PUBLICATIONS

"Development of diffractive optics and future challenges" Japan Women's Unversity Journal, Faculty of Science, 10th Edition, pp. 7 to 24 (2002).

Holm, J., et al., "Fusion Bonded Transmission Gratings for Temperature Compensated DWDM De-Multiplexing" Friday Morning/OFC 2003/vol. 2, pp. 727-728.

Gerritsen. H., et al., "Rectangular Surface-Relief Transmission Gratings with a Very Large First-Order Diffraction Efficiency (-95%) for Unpolarized Light", Applied Optics, Sep. 1, 1998, vol. 37, No. 25, pp. 5823-5829.

Agilent Technologies "Low PDL 900 Oringinal Holographic Diffraction Gratings", Jun. 18, 2002.

* cited by examiner

*Primary Examiner*—Fayez G. Assaf
(74) *Attorney, Agent, or Firm*—McDermott Will & Emery LLP

(57) ABSTRACT

The present invention provides a diffraction grating element that allows the temperature control mechanism to be dispensed with or simplified. The diffraction grating element of the present invention comprises a transparent plate having a first surface and a second surface that are substantially parallel with one another; and a diffraction grating which is formed on a first surface side with respect to the second surface and is substantially parallel with the first surface. At any temperature within a temperature range $-20°$ C. to $+80°$ C., the sum of the rate of change in the period per unit length of the diffraction grating with respect to a temperature change, and the temperature coefficient of the refractive index of a medium that surrounds the diffraction grating element is 0.

12 Claims, 8 Drawing Sheets

DIFFRACTION GRATING ELEMENT

CROSS-REFERENCE TO RELATED APPLICATION

This application is a continuation of Application No. 10/761,433 filed Jan. 22, 2004.

This application claims priority to Provisional Application Ser. No. 60/442,508 filed on Jan. 27, 2003 and Provisional Application Ser. No. 60/461,420 filed on Apr. 10, 2003 which are hereby incorporated by reference in their entirety.

BACKGROUND OF THE INVENTION

1. Field of the Invention

The present invention relates to a diffraction grating element.

2. Related Background of the Invention

A diffraction grating element generally has a diffraction grating formed on a first surface of a transparent plate that comprises the first surface and a second surface that are parallel with one another (see Kashiko Kodate, "Development of diffractive optics and future challenges"; Japan Women's University Journal, Faculty of Science, 10th Edition, pages 7 to 24 (2002), for example). With this diffraction grating element, when, for example, light enters the first surface from a medium that is in contact with the first surface at a constant angle of incidence, this light is diffracted by the diffraction grating formed on the first surface, transmitted within the transparent plate, and then emitted to the medium in contact with the second surface. The diffraction angle of the light emitted from the second surface of the transparent plate varies according to the wavelength.

Therefore, the diffraction grating element can be used as a optical demultiplexer that demultiplexes incident light and emits the demultiplexed light. Further, when the light is guided in the opposite direction to this case, this diffraction grating element can be used as an optical multiplexer that multiplexes the incident light and emits the multiplexed light. In addition, by combining the diffraction grating element with other optical elements, a dispersion regulator that regulates the group delay time of the light in accordance with the wavelength can also be constituted, for example. Therefore, the diffraction grating element is one important optical device in a wavelength division multiplexing (WDM) optical communication system that multiplexes multiple wavelength signal light and then transmits this multiplexed light.

SUMMARY OF THE INVENTION

However, even if the wavelength and angle of incidence of the light entering the diffraction grating element are constant, the diffraction angle varies according to the temperature. In a case where the diffraction grating element is used in a WDM optical communication system, when the diffraction angle of the diffraction grating element changes, the loss of signal light is therefore large or the waveform of the signal light deteriorates, and hence a communication error sometimes occurs. In order to suppress this communication error, conventionally, there has been a need to provide an active temperature control mechanism that keeps the temperature of the diffraction grating element constant. However, the provision of the temperature control mechanism provokes an increase in the system costs and a system cost increase is also provoked due to the need for a supply of electrical power to the temperature control mechanism.

The present invention has been accomplished in order to solve the above problem, and an object of the present invention is to provide a diffraction grating element that allows the temperature control mechanism to be dispensed with or simplified.

A diffraction grating element according to one aspect of the present invention comprises: a transparent plate having a first surface and a second surface that are substantially parallel with one another; and a diffraction grating which is formed on a first surface side with respect to the second surface and is substantially parallel with the first surface. At any temperature within a temperature range from −20° C. to +80° C., the sum of the rate of change in the period per unit length of the diffraction grating with respect to a temperature change, and the temperature coefficient of the refractive index of a medium that surrounds the diffraction grating element is 0. When the diffraction grating element is used in the typical environment temperature range from −20° C. to +80° C. of an optical communication system, the temperature control mechanism can be dispensed with or simplified.

Preferably, in the diffraction grating element of the present invention, the medium is air, and the rate of change in the period per unit length of the diffraction grating with respect to a temperature change is from $0.63 \times 10^{-6}/K$ to $1.23 \times 10^{-6}/K$. In this case, at any temperature within the temperature range from −20° C. to +80° C., under atmospheric pressure, the sum of the linear expansion coefficient of the period of the diffraction grating, that is, the rate of change in the period per unit length of the diffraction grating with respect to a temperature change, and the temperature coefficient of the refractive index of the medium is 0.

The diffraction grating element according to another aspect of the present invention comprises: a transparent plate having a first surface and a second surface that are substantially parallel with one another; and a diffraction grating which is formed on a first surface side with respect to the second surface and is substantially parallel with the first surface. The diffraction grating element is disposed in air; and the rate of change in the period per unit length of the diffraction grating with respect to a temperature change is from $0.6 \times 10^{-6}/K$ to $1.11 \times 10^{-6}/K$. In the case of this diffraction grating element, the maximum wavelength shift under atmospheric pressure in the temperature range from −20° C. to +80° C. is 0.04 nm or less. Therefore, the diffraction grating element can be suitably used in a WDM optical communication system in which the optical frequency interval of multiple wavelength signal light is 100 GHz.

In the diffraction grating element of the present invention, the rate of change in the period per unit length of the diffraction grating with respect to a temperature change can be from $0.80 \times 10^{-6}/K$ to $0.95 \times 10^{-6}/K$. According to this diffraction grating element, the maximum wavelength shift under atmospheric pressure in the temperature range from −20° C. to +80° C. is 0.02 nm or less. Therefore, the diffraction grating element can be suitably used in a WDM optical communication system in which the optical frequency interval of multiple wavelength signal light is 50 GHz.

The diffraction grating element according to another aspect of the present invention comprises: a transparent plate having a first surface and a second surface that are substantially parallel with one another; and a diffraction grating which is formed on a first surface side with respect to the second surface and is substantially parallel with the first surface. The diffraction grating element is disposed in a hermetically sealed gas or in a vacuum; and the rate of change in the period per unit length of the diffraction grating with respect to a temperature change is $2.4 \times 10^{-7}/K$ or less. In the case of this diffraction grating element, the maximum wavelength shift when the diffraction grating element is hermetically sealed or in a vacuum in the temperature range from $-20°$ C. to $+80°$ C. is 0.04 nm or less. Therefore, the diffraction grating element can be suitably used in a WDM optical communication system in which the optical frequency interval of multiple wavelength signal light is 100 GHz.

In the diffraction grating element of the present invention, the rate of change in the period per unit length of the diffraction grating with respect to a temperature change can be $1.2 \times 10^{-7}/K$ or less. According to this diffraction grating element, the maximum wavelength shift when the diffraction grating element is hermetically sealed or in a vacuum in the temperature range from $-20°$ C. to $+80°$ C. is 0.02 nm or less. Therefore, the diffraction grating element can be suitably used in a WDM optical communication system in which the optical frequency interval of multiple wavelength signal light is 50 GHz.

In the diffraction grating element of the present invention, the diffraction grating may be formed on the first surface. The diffraction grating may also be supported by the first surface. In addition, the diffraction grating could also be formed within the transparent plate.

In the diffraction grating element according to the present invention, the transparent plate could also preferably be made of silica glass to which an impurity has been added. The transparent plate could also preferably be made of silica glass or crystallized glass to which an impurity has been added. The transparent plate could also preferably be constituted by laminating a plurality of optical glasses with different linear expansion coefficients. Alternatively, the transparent plate could also preferably be made of silica glass to which an impurity has been added at a different concentration in the thickness direction.

In the case where an impurity is added to the transparent plate, the impurity is preferably any element among Ge, P, and B. Alternatively, the impurity is also preferably element Ti. For example, by adding an impurity of an appropriate concentration by means of VAD or CVD, or the like, the rate of change in the period per unit length with respect to a temperature change of the diffraction grating formed to the transparent plate, that is, the linear expansion coefficient of the diffraction grating can be afforded the desired value. The section of the transparent plate where the diffraction grating is formed preferably is made of silica glass, and, in this case, the workability when forming the diffraction grating is highly superior.

In the case of the diffraction grating element according to the present invention, the distribution of material in the thickness direction of the transparent plate, that is, the linear expansion coefficient distribution, is preferably symmetrical. In this case, the occurrence of warp of the transparent plate is suppressed even in the event of a temperature change. In addition, the diffraction grating is preferably formed in the center in the thickness direction of the transparent plate. Here, the temperature dependence of the light emission position is also reduced.

In the case of the diffraction grating element according to the present invention, the diffraction efficiency is preferably substantially polarization-independent. As a result, even when the polarization state of the incident light is not constant, the incident light can be diffracted with constant diffraction efficiency without using other optical elements as required conventionally (polarization separation element, polarization composing element, and so forth).

DESCRIPTION OF THE PREFERRED EMBODIMENTS

Figure 1:
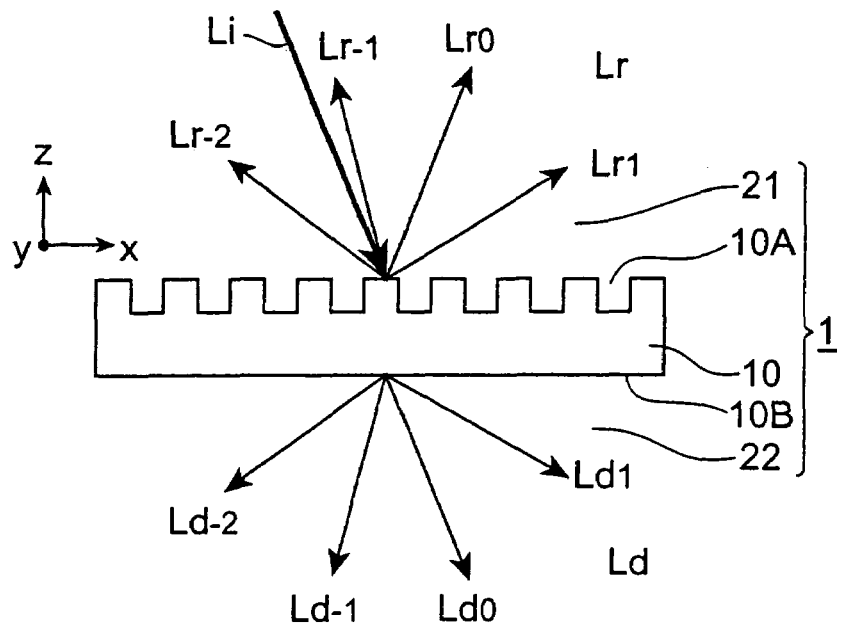
FIG. 1 is a sectional view of a diffraction grating element 1 relating to the embodiment.

Referring to the attached drawings, embodiments of the present invention will be described in detail below with. The same reference symbols have been assigned to the same elements or parts in the description of the drawings, and hence repetitive description is omitted here. Further, a xyz Cartesian coordinate system is sometimes shown in the drawings in order to facilitate the description.

FIG. 1 is a sectional view of the diffraction grating element 1 relating to this embodiment. The diffraction grating element 1 shown in this figure has the transparent plate 10 that comprises a first surface 10A and a second surface 10B that are substantially parallel with one another. The diffraction grating element 1 has a diffraction grating formed in the first surface 10A. The diffraction grating element 1 is in contact with a surrounding medium. In FIG. 1, the first surface 10A of the diffraction grating element 1 is in contact with a medium 21 and the second surface 10B is in contact with a medium 22. The grating direction of the diffraction grating formed in the first surface 10A is parallel with the y axis direction, and a recess and protrusion are cyclically formed at a period $\Lambda$ in the x axis direction. In addition, a reflection reduction film is suitably provided on the second surface 10B. In this case, the diffraction efficiency is highly superior. Further, although medium 21 and 22 are air, for example, these medium are not limited to air. Further, the transparent plate 10 consists of silica glass, for example, but need not be silica glass.

In this diffraction grating element 1, light (incident light Li) enters the first surface 10A of the transparent plate 10 via the medium 21. The incident plane is parallel with the plane xz. The incident light Li is diffracted by the diffraction grating formed in the first surface 10A, is transmitted within the transparent plate 10, and then emitted to the medium 22 in contact with the second surface 10B. In FIG. 1, the light that is emitted to the medium 22 is shown as the diffracted light Ld. In FIG. 1, the diffracted light Ld is shown as the −2 order diffracted light $Ld_{-2}$, the −1 order diffracted light $Ld_{-1}$, the 0 order diffracted light $Ld_0$, and the 1 order diffracted light $Ld_1$. Further, in FIG. 1, the light reflected by the first surface 10A is shown as the reflected light Lr. In FIG. 1, the reflected light Lr is shown as the −2 order reflected light $Lr_{-2}$, the −1 order reflected light $Lr_{-1}$, the 0 order reflected light $Lr_0$, and the 1 order reflected light $Lr_1$.

The diffraction angle θm of the m-order diffracted light emitted by the second surface 10B of the transparent plate 10 is expressed by means of the equation:

$$\theta_m = \sin^{-1}\left(\sin\theta + \frac{m\lambda}{n\Lambda}\right) \quad (1)$$

Here, θ is the angle of incidence, λ is the wavelength of light in a vacuum, and n is the refractive index of the medium 21, 22. As may be understood from this equation, the diffraction angle θm is dependent on the wavelength λ and hence the diffraction grating element 1 is used as an optical demultiplexer or optical multiplexer, for example, or can also be used as one component of a dispersion regulator.

Figure 2:
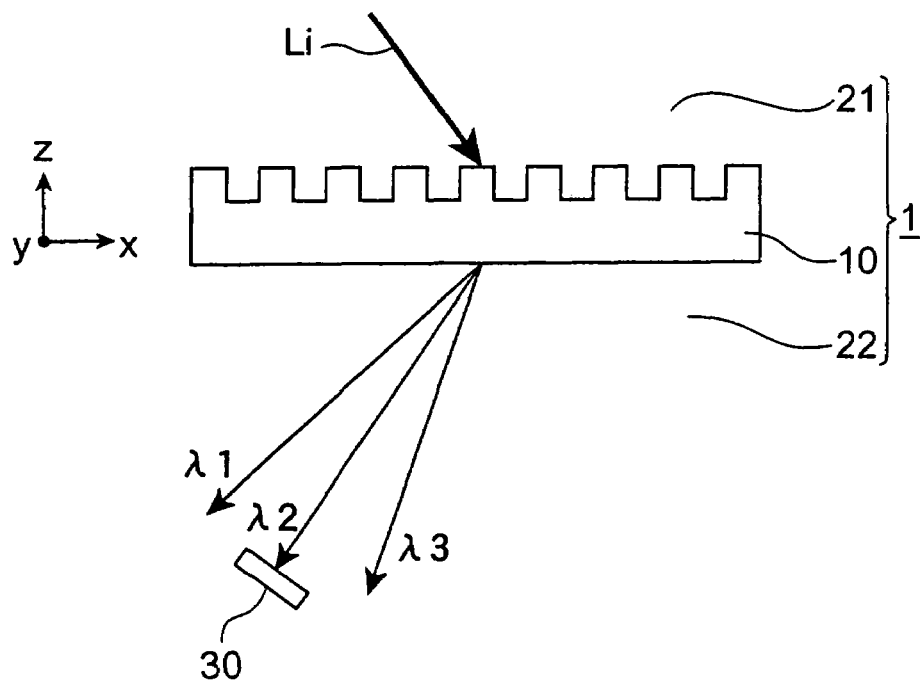
FIG. 2 illustrates a problem confronted by diffraction grating elements.

Further, when the temperature T changes, the following problems arise. FIG. 2 illustrates a problem confronted by diffraction grating elements. Generally, the refractive index n of the medium 21 and 22 is a function of the temperature T, and because the period Λ of the diffraction grating is also a function of the temperature T, the diffraction angle θm varies according to the temperature T. If, as shown in FIG. 2, the incident light Li contains the wavelength components λ1 to λ3, supposing that the optical system is regulated such that a component of wavelength λ2 in the diffracted light excluding the 0 order diffracted light is received by an optical element 30 (photo diode, mirror, and so forth, for example), when the diffraction angle θm changes according to the change of temperature T, the wavelength of the light entering the optical element 30 shifts when the diffraction angle θm changes following a change in the temperature T. Therefore, conventionally, there has been a need to provide an active temperature control mechanism that keeps the temperature of the diffraction grating element constant.

The diffraction grating element 1 relating to this embodiment is capable of resolving this problem. That is, when the product (nΛ), which is the temperature dependent component on the right side of Equation (1) above, is derived at temperature T, the equation $$\frac{d(n\Lambda)}{dT} = n\Lambda\left(\frac{1}{n}\frac{dn}{dT} + \frac{1}{\Lambda}\frac{d\Lambda}{dT}\right) \quad (2)$$

is obtained. If the right side of Equation (2) is 0, the product (nΛ) is constant and not dependent on the temperature T. Therefore, the diffraction angle θm is constant and not dependent on the temperature T.

Here, the second item in the brackets on the right side of Equation (2) above is the linear expansion coefficient α of the period Λ of the diffraction grating that is represented by the equation:

$$\alpha = \frac{1}{\Lambda}\frac{d\Lambda}{dT} \quad (3)$$

That is, the linear expansion coefficient α of the period Λ of the diffraction grating is synonymous with the rate of change in the period Λ per unit length of the diffraction grating with respect to a temperature change. In this specification, the rate of change in the period Λ per unit length of the diffraction grating with respect to a temperature change is referred to as the linear expansion coefficient α of the period Λ of the diffraction grating.

Further, the first item in brackets on the right side of Equation (2) above is the temperature coefficient β for the refractive index n of the medium 21, 22 that is represented by the equation:

$$\beta = \frac{1}{n}\frac{dn}{dT} \quad (4)$$

Therefore, if the sum of the linear expansion coefficient α of the period Λ of the diffraction grating and the temperature coefficient β for the refractive index n of the medium 21, 22 is 0, that is, if the relational expression $$\alpha + \beta = 0 \quad (5)$$

is established, the diffraction angle θm is constant and not dependent on the temperature T.

With the diffraction grating element 1 relating to this embodiment, at any temperature within the temperature range from −20° C. to +80° C., the sum of the linear expansion coefficient α of the period Λ of the diffraction grating, and the temperature coefficient β for the refractive index n of the medium 21 and 22 is 0. As a result, when the diffraction grating element 1 is employed in the typical environment temperature range −20° C. to +80° C. in an optical communication system, the temperature control mechanism can be dispensed with or simplified.

Figure 3:
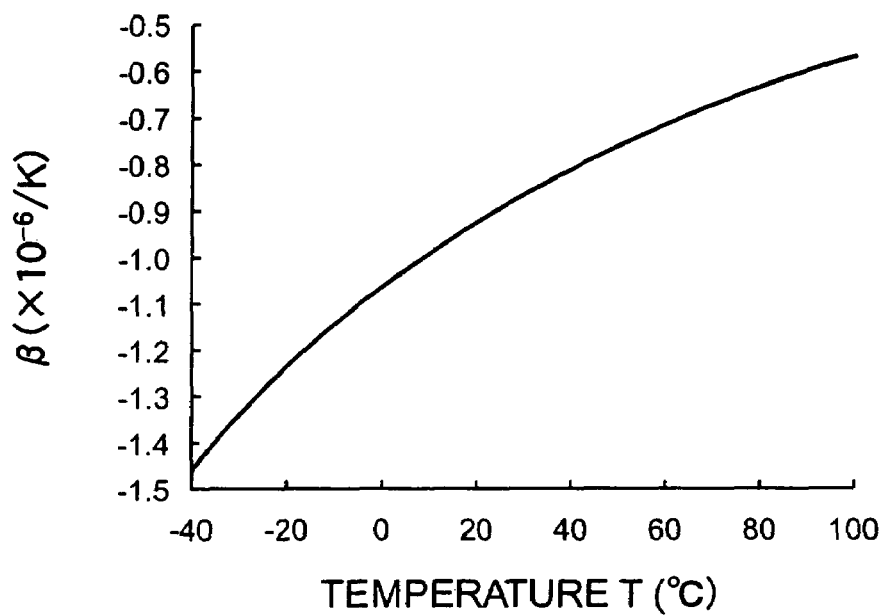
FIG. 3 is a graph that shows the relationship between the temperature T and the temperature coefficient of the refractive index n of air.

A case where the medium 21 and 22 are air will be described below. FIG. 3 is a graph that shows the relationship between the temperature T and the temperature coefficient β of the refractive index n of air under atmospheric pressure. As shown, the dependence of the refractive index n of air on the temperature T is small and is almost equal to the value 1. However, the temperature coefficient β of the refractive index n of air varies with a large dependence on the temperature T. Further, if the linear expansion coefficient α(unit: 1/K) of the period Λ of the diffraction grating is within the numerical value range:

$$0.63 \times 10^{-6} < \alpha < 1.23 \times 10^{-6} \quad (6)$$

the relation of Equation (5) above is established under atmospheric pressure at any temperature within the temperature range from −20° C. to +80° C. Further, if the linear expansion coefficient α of the period Λ of the diffraction grating is 0.89×10⁻⁶/K, the relation of Equation (5) above is established under atmospheric pressure at close to 25° C., which is the ordinary usage temperature.

Figure 4:
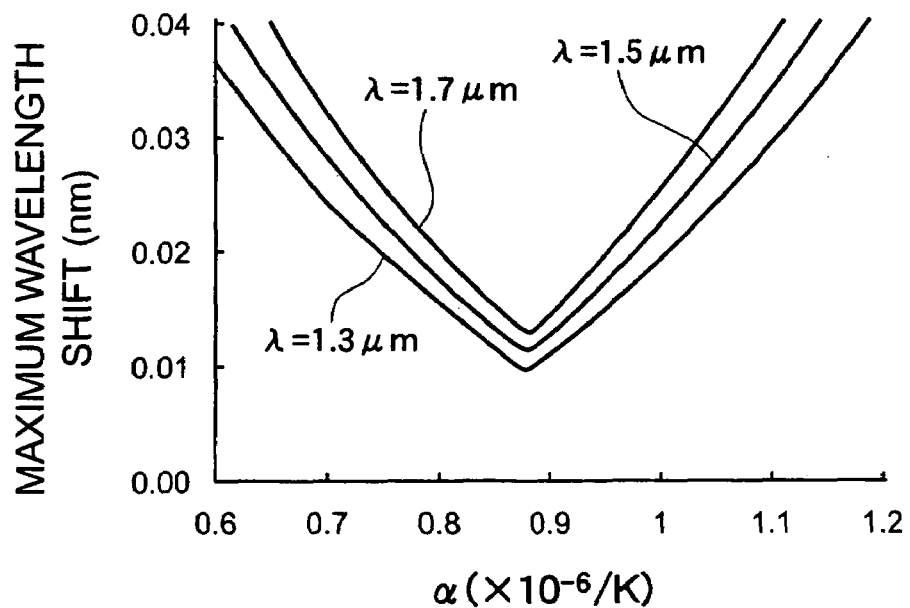
FIG. 4 is a graph showing the relationship between the maximum wavelength shift in the temperature range from $-20°$ C. to $+80°$ C. and the linear expansion coefficient $\alpha$ of the period $\Lambda$ of the diffraction grating.

Further, as described by using FIG. 2, generally, when the temperature T changes, the wavelength of the diffracted light entering the optical element 30 undergoes a shift. FIG. 4 is a graph showing the relationship between the maximum wavelength shift in the temperature range from −20° C. to +80° C. and the linear expansion coefficient α of the period Λ of the diffraction grating. This figure illustrates a case where the wavelength λ is 1.3 µm, 1.5 µm, and 1.7 µm respectively. Further, in a WDM optical communication system, the wavelength band equal to or less than the wavelength 1.7 µm is generally used as the signal light wavelength band.

In cases where the optical frequency interval of multiple wavelength signal light in a WDM optical communication system is 100 GHz, the maximum wavelength shift under atmospheric pressure in the temperature range from −20° C. to +80° C. must be 0.04 nm or less. Therefore, according to FIG. 4, the linear expansion coefficient α (unit: 1/K) of the period Λ of the diffraction grating may fall in the numerical value range:

$$0.65 \times 10^{-6} < \alpha < 1.11 \times 10^{-6} \quad (7)$$

In addition, in cases where the optical frequency interval of the multiple wavelength signal light is 50 GHz, the maximum wavelength shift under atmospheric pressure in the temperature range from −20° C. to +80° C. must be 0.02 nm or less. Therefore, the linear expansion coefficient α (unit: 1/K) of period Λ of the diffraction grating may fall in the numerical value range:

$$0.80 \times 10^{-6} < \alpha < 0.95 \times 10^{-6} \quad (8)$$

As described above, because the linear expansion coefficient α of the period Λ of the diffraction grating is in a suitable range, the diffraction grating element 1 relating to this embodiment is able to fulfill the accuracy required for WDM optical communications in the temperature range from −20° C. to +80° C., and hence the temperature control mechanism can be dispensed with or simplified. Note that the required accuracy varies according to the wavelength band for multiple wavelength signal light and the optical frequency interval.

In the following, a method for implementing the desired value of the linear expansion coefficient α of the period Λ of the diffraction grating will be described. As a first method, an impurity (Ge, P, and B, or the like) may be added to silica glass to form the transparent plate 10. The linear expansion coefficient of silica glass is 0.5×10⁻⁶/K, and that is outside the numerical value range above. However, by appropriately setting the addition concentration of the impurity added to the silica glass, it is possible to implement the desired value for the linear expansion coefficient of the silica glass.

For example, when the impurity added to the silica glass is Ge, the linear expansion coefficient α (unit: 1/K) of the silica glass is expressed, given a Ge addition concentration $M_{Ge}$ (unit: mol %), by the relational expression:

$$\alpha = 0.5 \times 10^{-6} + 0.076 \times 10^{-6} M_{Ge} \quad (9)$$

Therefore, in order to render the numerical value range of the linear expansion coefficient α expressed by Equation (6) above, the Ge addition concentration $M_{Ge}$ may be from 1.7 mol % to 9.6 mol %. In addition, in order to render the numerical value range of the linear expansion coefficient α expressed by Equation (8) above, the Ge addition concentration $M_{Ge}$ may be 3.9 mol % to 5.9 mol %.

So too when another impurity (P, B, or the like) other than Ge is added, by appropriately setting the addition concentration, the desired value for the linear expansion coefficient of the silica glass can be implemented. Further, when the productivity of the transparent plate 10 is considered, a plurality of types of impurity is suitably added to the silica glass. Further, manufacture can be performed by VAD or CVD, for example.

Figure 5:
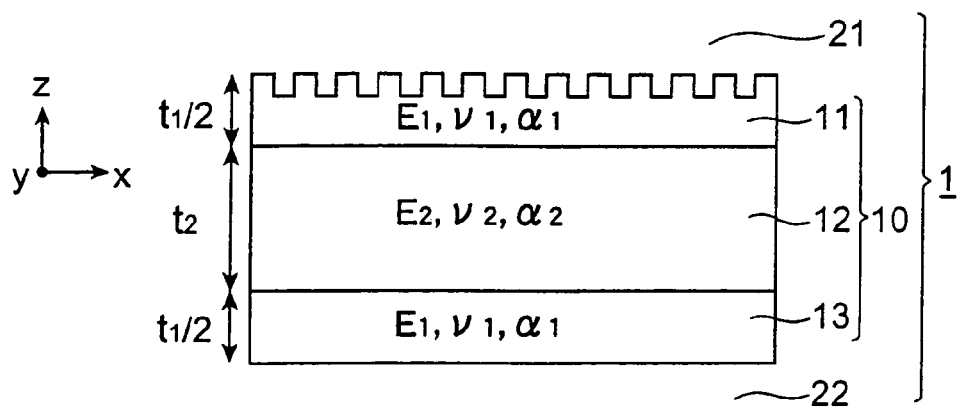
FIG. 5 is an explanatory view of another constitutional example of the diffraction grating element 1 relating to the embodiment.

As a second method for implementing the desired value for the linear expansion coefficient α of the period Λ of the diffraction grating, a plurality of optical glasses that have different linear expansion coefficients may be laminated to form the transparent plate 10. FIG. 5 is an explanatory view of another constitutional example of the diffraction grating element 1 relating to this embodiment. In the diffraction grating element 1 shown here, the transparent plate 10 is produced by sequentially laminating three optical glasses 11 to 13. The optical glass 11 is in contact with the medium 21 and the optical glass 13 is in contact with the medium 22, and the optical glass 12 is interposed between the optical glass 11 and the optical glass 13.

Further, the linear expansion coefficient distribution in the thickness direction of the transparent plate 10 is suitably symmetrical. In this case, the occurrence of warp of the transparent plate 10 is suppressed even in the event of a temperature change. Supposing that the optical glasses 11 and 13 each have a thickness of t1/2, Young's modulus is E1, Poisson's ratio is ν1, and the linear expansion coefficient is α1. Let us suppose also that for the optical glass 12, the thickness is t2, Young's modulus is E2, Poisson's ratio is ν2, and the linear expansion coefficient is α2. The linear expansion coefficient (that is, the linear expansion coefficient α of the period Λ of the diffraction grating) of the transparent plate 10 is then expressed by the equation:

$$\alpha = \frac{\frac{E_1 t_1}{1 - \nu_1} \alpha_1 + \frac{E_2 t_2}{1 - \nu_2} \alpha_2}{\frac{E_1 t_1}{1 - \nu_1} + \frac{E_2 t_2}{1 - \nu_2}} \quad (10)$$

Further, because the thickness of each of the optical glasses 11 to 13 is sufficiently large due to the thickness of the recesses and protrusions of the diffraction grating, the influence exerted by the recesses and protrusions of the diffraction grating can be disregarded.

Further, the machinability of the optical glass 11 and the optical glass 13 for the formation of the diffraction grating is suitably highly superior. The physicality and thickness of the optical glass 12 are suitably set appropriately so that the linear expansion coefficient α of the period Λ of the diffraction grating is afforded the desired value in accordance with Equation (10) above. For example, the optical glass 11 and optical glass 13 suitably is made of silica glass. In addition, the optical glass 12 suitably made of silica glass to which Ge has been added as an impurity.

Figure 6:
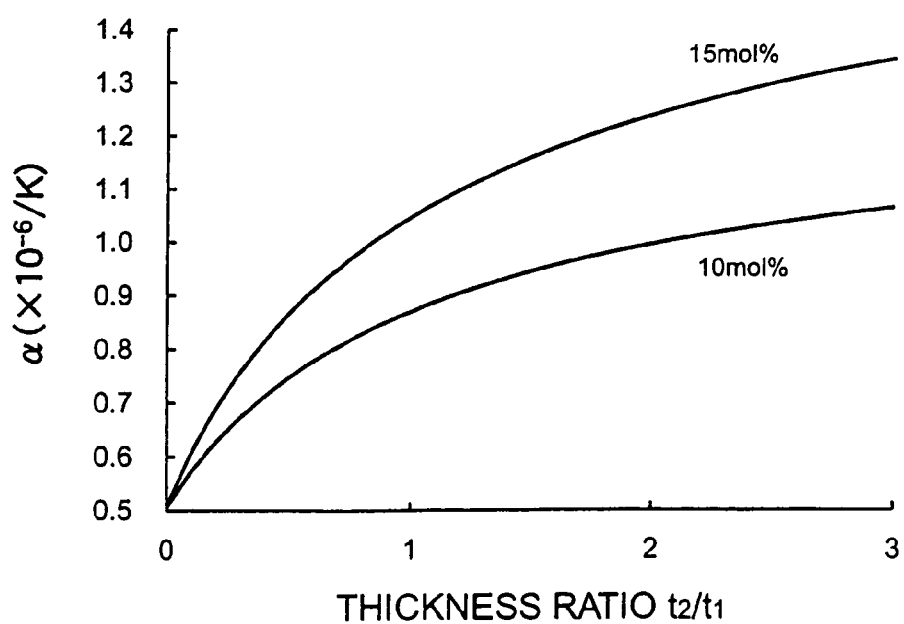
FIG. 6 is a graph showing the relationship between the linear expansion coefficients $\alpha$ of the period $\Lambda$ of the diffraction grating and the thickness ratio (t2/t1)

FIG. 6 is a graph showing the relationship between the linear expansion coefficients α of the period Λ of the diffraction grating, and the thickness ratio (t2/t1). Here, the impurity added to the optical glass 12 is Ge, and the addition concentration is set at 10 mol % and 15 mol % respectively.

As may be seen from this figure, by suitably setting the impurity addition concentration and thickness of the optical glass 12, the linear expansion coefficient α of the period Λ of the diffraction grating can be afforded the desired value.

Here, when the difference between the refractive index of the optical glasses 11 and 13 and the refractive index of the optical glass 12 is large, the reflection of light at the interface between these optical glasses is large and hence the diffraction efficiency is poor. Therefore, in order to suppress reflection at the interface, the refractive index difference is preferably smaller. When the optical glasses 11 and 13 are silica glass and the optical glass 12 is silica glass whose Ge addition concentration is 15 mol %, the refractive index difference is extremely small at 0.022 and hence reflection at the interface is suppressed.

An adhesive is used for the pasting together of the optical glasses 11 to 13. The refractive index of this adhesive is preferably also close to the refractive index of the optical glasses 11 to 13. Anode bonding may also be used for the pasting together of the optical glasses 11 to 13. In this case, adhesive is unnecessary and hence there is no influence exerted by the linear expansion of the adhesive. Hence, anode bonding is also suitable in this respect.

Figure 7:
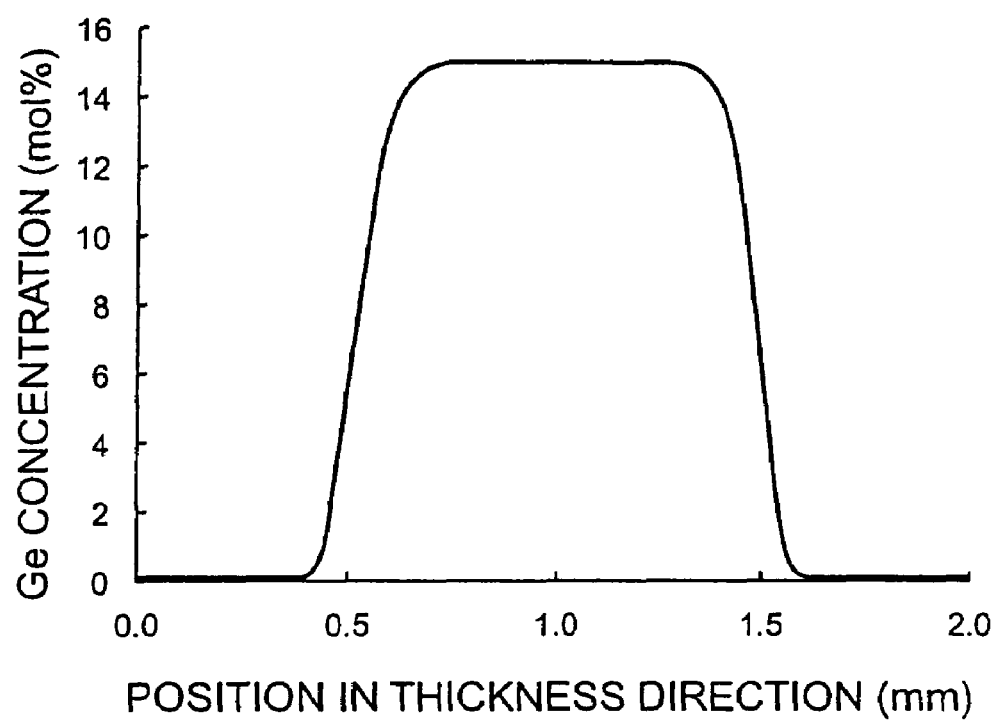
FIG. 7 is an explanatory view of yet another constitutional example of the diffraction grating element 1 relating to the embodiment.

As a third method for implementing the desired value of the linear expansion coefficient α of the period Λ of the diffraction grating, the transparent plate 10 may be made of silica glass to which an impurity (Ge, P and B, and so forth) has been added in a different concentration in the thickness direction. FIG. 7 is an explanatory view of yet another constitutional example of the diffraction grating element 1 relating to this embodiment. This figure shows the addition concentration distribution of Ge in the thickness direction of the transparent plate 10. In the case of the diffraction grating element 1, which has the Ge addition concentration distribution shown in the figure, the transparent plate 10 is silica glass in neighboring regions that include the first surface 10A and second surface 10B respectively and has Ge added as an impurity in a middle region. This transparent plate 10 is manufactured by means of VAD and CVD and so forth.

In this case also, the linear expansion coefficient distribution is suitably symmetrical in the thickness direction of the transparent plate 10. With the diffraction grating element 1, which has the symmetrical linear expansion coefficient distribution, the occurrence of warp of the transparent plate 10 is suppressed even in the event of a temperature change.

The linear expansion coefficient of the transparent plate 10 (that is, the linear expansion coefficient α of the period Λ of the diffraction grating) is expressed by the equation:

$$\alpha = \frac{\int_0^l \frac{E(z)}{1-v(z)} \alpha(z) dz}{\int_0^l \frac{E(z)}{1-v(z)} dz} \quad (11)$$

Here, l is the thickness of the transparent plate 10 and the z coordinate value of the second surface 10B is 0.

Neighboring regions that include the first surface 10A and the second surface 10B respectively are silica glass and hence the machinability is suitably highly superior in order to form the diffraction grating. By appropriately setting the impurity addition concentration and the thickness in accordance with Equation (11) above, the linear expansion coefficient α of the period Λ of the diffraction grating can be afforded the desired value. Further, by smoothly changing the impurity addition concentration in the thickness direction, the refractive index can be changed smoothly in the thickness direction. As a result, the reflection of light in sections exhibiting a refractive index variation can be suppressed.

Figure 8:
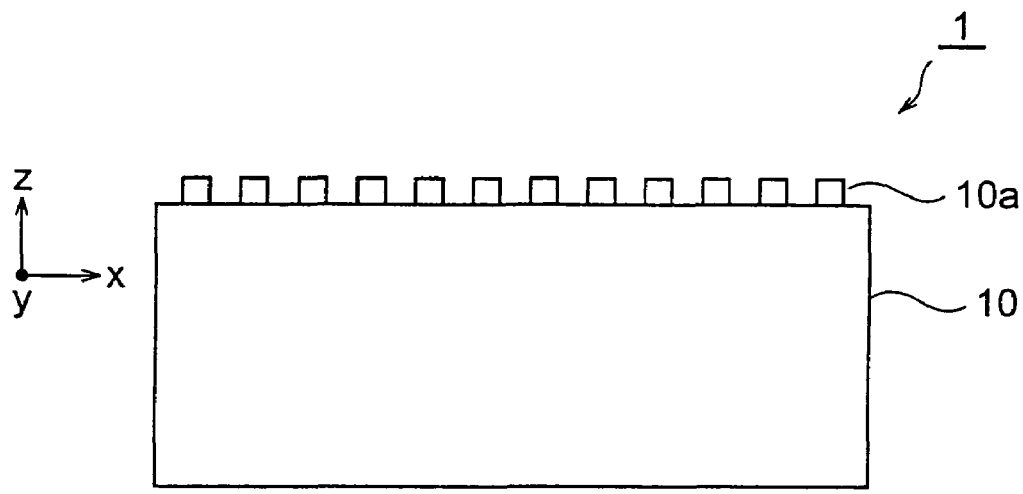
FIG. 8 is an explanatory view of yet another constitutional example of the diffraction grating element 1 relating to the embodiment.
Figure 9:
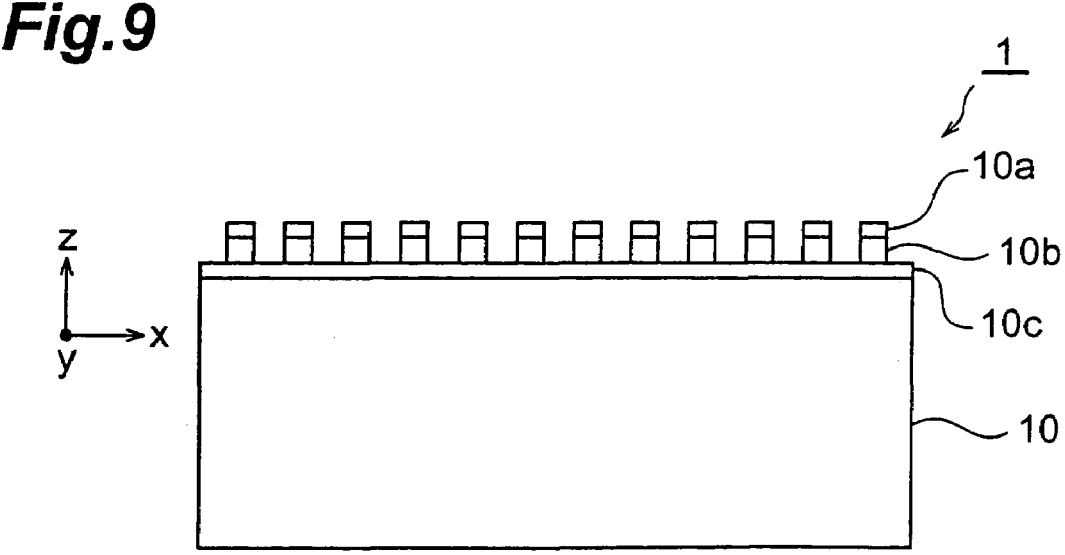
FIG. 9 is an explanatory view of yet another constitutional example of the diffraction grating element 1 relating to the embodiment.

As a fourth method for implementing the desired value of the linear expansion coefficient α of the period Λ of the diffraction grating, the diffraction grating may be formed by forming a film on one side of the transparent plate 10 and then performing etching. That is, the diffraction grating may be supported by one surface (the first surface 10A) of the transparent plate 10. FIGS. 8 and 9 are explanatory views of yet another constitutional example of the diffraction grating element 1 relating to this embodiment. In the diffraction grating element 1 which is shown in these figures, the transparent plate 10 is made of silica glass to which an impurity such as the element Ge or Ti, or the like, has been added, for example.

The diffraction grating element 1 shown in FIG. 8 is a diffraction grating formed by the vapor deposition of a single-layer film 10a on one side of the transparent plate 10, and then etching by means of patterning to leave a film 10a on the period Λ pattern. That is, the diffraction grating element 1 shown in FIG. 8 has a diffraction grating formed on one surface (the first surface 10A) of the transparent plate 10. The diffraction grating element 1 has a diffraction grating directly supported by one surface of the transparent plate 10 (the first surface 10A).

The diffraction grating element 1 shown in FIG. 9 is a diffraction grating which is formed by the vapor deposition of multiple layer films 10a, 10b, and 10c on one side of the transparent plate 10, and then etching by means of patterning to leave films 10a, 10b on the period Λ pattern. That is, in the case of the diffraction grating element 1 shown in FIG. 9, the diffraction grating is supported by one surface (the first surface 10A) of the transparent plate 10 via the film 10c.

In this diffraction grating element 1, the linear expansion coefficient α of the period Λ of the diffraction grating is afforded the desired value by appropriately adjusting the addition concentration of the impurity which has been added to the transparent plate 10. Further, in this case, even when etching of the transparent plate 10 is difficult, by appropriately selecting the material of the film formed on the one side, the diffraction grating can be formed easily. In addition, in the case of the diffraction grating element 1 shown in FIG. 9 in particular, the polarization dependence of the diffraction characteristic in a broad wavelength band can be reduced by appropriately selecting the refractive index of each of the films 10a, 10b, and 10c.

In the description of the embodiments hereinabove, it was assumed that the diffraction grating element 1 was placed under atmospheric pressure and the medium 21 and 22 were gases at atmospheric pressure. However, there are cases where the diffraction grating element 1 is hermetically sealed in a package. In this case, a temperature change results in a change in the gas pressure, and the refractive index of the gas changes as a result of this change in pressure. A case where the diffraction grating element 1 is hermetically sealed will be described below.

The diffraction grating element 1 relating to this embodiment is used, not only as an optical demultiplexer or optical multiplexer, but also suitably in a WDM optical communication system as a component of an optical module such as a dispersion regulator, spectral detector and an optical filter. Further, in these optical modules, the diffraction grating element 1 is sometimes provided in a package together with semiconductor parts such as a laser diode, photodiode, and a MEMS (Micro Electro Mechanical System). Further, generally speaking, the semiconductor parts are hermetically sealed in order to prevent degradation caused by the effects of hydrogen and water vapor. Further, also in the case of the optical modules not including semiconductor parts, by suppressing the adhesion of foreign matter to the diffraction grating element 1 by means of hermetic sealing, favorable characteristics can be maintained. A concrete example where the temperature dependence of the diffraction characteristic is reduced by means of hermetic sealing is illustrated below.

The refractive index n of gas is generally expressed by the equation:

$$n = 1 + \Delta n \quad (12)$$

Here, $\Delta n$ expresses the difference with respect to the refractive index of a vacuum. $\Delta n$ varies according to the gas. The values of He, Ne, Ar and $N_2$ at one atmosphere when the temperature is 0° C. are:

$$\text{He } \Delta n = 0.35 \times 10^{-4} \quad (13a)$$

$$\text{Ne } \Delta n = 0.67 \times 10^{-4} \quad (13b)$$

$$\text{Ar } \Delta n = 2.84 \times 10^{-4} \quad (13c)$$

$$N_2 \ \Delta n = 2.97 \times 10^{-4} \quad (13d)$$

When the temperature or pressure changes, $\Delta n$ varies substantially in proportion to the gas density. Supposing that the gas density in the event of a hermetic seal is $\rho 0$, the gas temperature in the event of a hermetic seal is T0, and the cubic expansion coefficient of the gas is $\gamma$. Here, the refractive index n of the gas at the temperature T is expressed by the equation:

$$n = 1 + \Delta n \frac{\rho}{\rho_0} \quad (14)$$

The density $\rho$ of the gas at temperature T is expressed by the equation:

$$\frac{\rho}{\rho_0} = 1 - \gamma(T - T_0) \quad (15)$$

Accordingly, the temperature coefficient $\beta$ of the refractive index of the gas in the event of a hermetic seal is expressed by the equation:

$$\beta = -\Delta n \gamma \quad (16)$$

When the material of the package that houses and seals the diffraction grating element 1 (and the semiconductor parts) is Al (aluminum), the linear expansion coefficient of the package is $23 \times 10^{-6}$/° C., and hence the cubic expansion coefficient $\gamma$ of the gas within the package is $69 \times 10^{-6}$/° C. ($=3 \times 23 \times 10^{-6}$). Accordingly, when the gas is He, the temperature coefficient $\beta$ of the refractive index of the gas in the event of a hermetic seal is $-0.024 \times 10^{-7}$/° C., and is $-0.20 \times 10^{-7}$/° C. for N2 gas.

The absolute value of this value of the temperature coefficient $\beta$ of the refractive index of the gas in the event of a hermetic seal is also one or more digits smaller than the linear expansion coefficient $5 \times 10^{-7}$/° C. of silica glass. Further, at atmospheric pressure, the cubic expansion coefficient of the gas is inversely proportional to the absolute temperature and is $3.7 \times 10^{-3}$/° C. ($=1/273$) at a temperature of 0° C., for example. Therefore, the absolute value of the cubic expansion coefficient $\gamma$ of the gas that is hermetically sealed by means of an Al package is also two or more digits smaller than the cubic expansion coefficient of the gas at atmospheric pressure.

In comparison with a case where the diffraction grating element 1 is placed under atmospheric pressure, in a case where the diffraction grating element 1 is hermetically sealed in this manner, the temperature coefficient $\beta$ of the refractive index n of the gas (medium 21 and 22) is small and the temperature dependence of the temperature coefficient $\beta$ is also small, and hence the suitable range for the linear expansion coefficient $\alpha$ of the period $\Lambda$ of the diffraction grating varies.

In a case where the diffraction grating element 1 is used in a WDM optical communication system without temperature adjustment, when the optical frequency interval of the multiple wavelength signal light is 100 GHz, the wavelength shift of the diffraction grating for each unit temperature change is desirably 0.4 pm/° C. or less (the wavelength shift in the temperature range from −20° C. to +80° C. is equal to or less than 0.04 nm). Further, when the optical frequency interval of the multiple wavelength signal light is 50 GHz, the wavelength shift of the diffraction grating for each unit temperature change is desirably 0.2 pm/° C. or less (the wavelength shift in the temperature range from −20° C. to +80° C. is equal to or less than 0.02 nm). Note that the required accuracy varies according to the wavelength band and optical frequency interval, and so forth, of the multiple wavelength signal light.

Here, the wavelength shift of the diffraction grating for each unit temperature change is expressed by the equation:

$$\frac{d\lambda}{dT} = \lambda(\alpha + \beta) \quad (17)$$

The wavelength of the signal light that is generally used in WDM optical communication is 1.7 μm or less, and hence, in order that the wavelength shift of the whole range of the signal light wavelength band should be 0.4 pm/° C. or less (or 0.2 pm/° C. or less), the following conditions may be satisfied:

$$|\alpha+\beta| \leq 0.4[\text{pm}/° \text{C.}]/1.7[\mu\text{m}] = 2.4 \times 10^{-7}[/° \text{C.}] \quad (18a)$$

$$|\alpha+\beta| \leq 0.2[\text{pm}/° \text{C.}]/1.7[\mu\text{m}] = 1.2 \times 10^{-7}[/° \text{C.}] \quad (18b)$$

The value on the right side of Equation (18) above is approximately one digit larger than the temperature coefficient $\beta$ of the refractive index n of the gas when the diffraction grating element 1 is hermetically sealed. So too when using an package made of a material with a large linear expansion coefficient such as Al (aluminum), if the diffraction grating element 1 is hermetically sealed in this package, the temperature coefficient $\beta$ of the refractive index n of the gas (medium 21 and 22) can be disregarded. Therefore, also inclusive of a case where the interior of the package is at a vacuum, the linear expansion coefficient $\alpha$ of the period $\Lambda$ of the diffraction grating may satisfy the following conditions when the optical frequency interval is 100 GHz and 50 GHz respectively:

$$|\alpha| \leq 2.4 \times 10^{-7}[/° \text{C.}] \quad (19a)$$

$$|\alpha| \leq 1.2 \times 10^{-7}[/° \text{C.}] \quad (19b)$$

Further, even in the event of sealing, when the linear expansion coefficient is large as is the case when the material of the sealing package is resin, Equations (18a) and (18b) above must be satisfied by considering the temperature coefficient β of the refractive index of the gas when the diffraction grating element 1 is hermetically sealed.

In a case where the diffraction grating element 1 is hermetically sealed, the linear expansion coefficient α of the period Λ of the diffraction grating must be smaller than the linear expansion coefficient (5×10$^{-7}$/° C.) of the silica glass. In order to achieve this, crystallized glass is suitably used for the transparent plate 10. Alternatively, silica glass to which the element Ti has been added is suitably used for the transparent plate 10. By adjusting the degree of crystallization when crystallized glass is used and adjusting the amount of Ti added in the case of silica glass to which the element Ti is added, the linear expansion coefficient can be afforded a value in the range from −20×10$^{-7}$/° C. to +5×10$^{-7}$/° C., for example. Further, glass which exhibits substantially no thermal expansion is suitably used for the transparent plate 10. Further, in the constitution shown in FIG. 5, silica glass may be used for the optical glasses 11 and 13 and glass with a negative linear expansion coefficient may be used for the optical glass 12.

The diffraction grating element 1 of the embodiments hereinabove had a diffraction grating formed in or above one surface of the transparent plate 10. However, a diffraction grating may be formed internally so as to lie substantially in parallel with the surface of the transparent plate. A diffraction grating element in which the diffraction grating is formed within the transparent plate will be described below.

Figure 10:
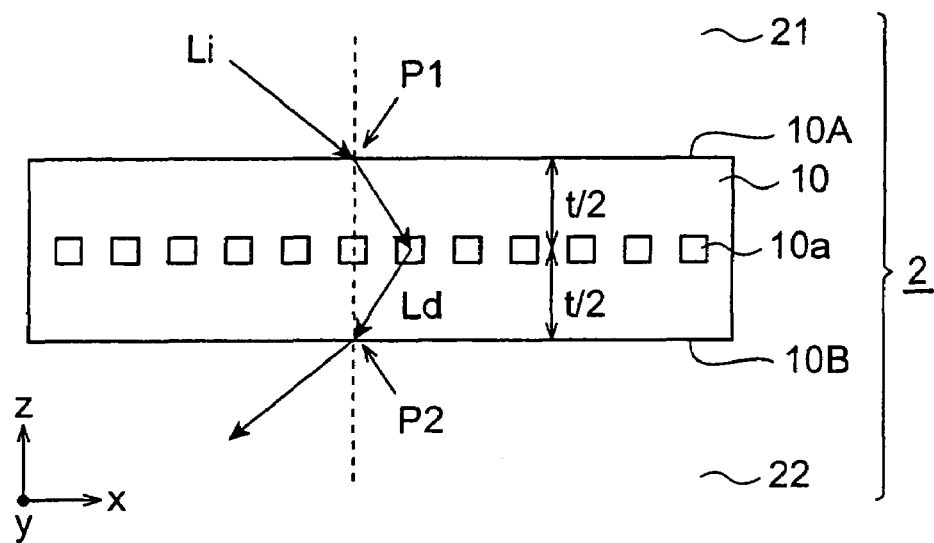
FIG. 10 is a sectional view of a diffraction grating element 2 relating to the embodiment.

FIG. 10 is a sectional view of a diffraction grating element 2 relating to this embodiment. The diffraction grating element 2 shown in this figure is one in which a diffraction grating 10a is formed within a transparent plate 10, which has a first surface 10A and a second surface 10B that are in parallel with one another and in contact with the medium 21 and 22 respectively, substantially in parallel with the first surface 10A. The transparent plate 10 is silica glass to which the element Ge or Ti, for example, has been added. The diffraction grating 10a is formed at the center in the thickness direction (z axis direction) of the transparent plate 10, is a vertically symmetrical structure, and is formed cyclically at the period Λ in the x axis direction with the grating direction parallel with the y axis. In addition, a reflection reduction film is suitably provided on the first surface 10A and the second surface 10B. So too in the case of the diffraction grating element 2, the linear expansion coefficient α of the period Λ of the diffraction grating satisfies any of Equations (5) to (8) above when the diffraction grating element is placed under atmospheric pressure, or satisfies Equation (18a) or (18b) above when the diffraction grating element is hermetically sealed. The temperature dependence of the diffraction angle of the diffraction grating element 2 is reduced in the same way as the diffraction grating element 1 mentioned earlier in which the diffraction grating is formed in or above the first surface 10A.

In addition, when the diffraction grating element 2 is used under the Bragg condition whereby a high diffraction efficiency is generally obtained, the temperature dependence of the position at which the light is emitted from the second surface 10B is also suppressed. That is, supposing that the angle of incidence of the light from the medium 21 to the first surface 10A (incident light Li) is θ, the wavelength of this light is λ, the period of the diffraction grating is Λ, and the refractive index of the medium 21 and 22 is n, the Bragg condition for the m-order diffracted light (the diffracted light is denoted by Ld in FIG. 10) is expressed by the equation:

$$\sin\theta = -\frac{m\lambda}{2n\Lambda} \qquad (20)$$

Under the Bragg condition, the angle of incidence and diffraction angle have equal absolute values of the opposite sign. Further, the diffraction grating 10a is formed in the center in the thickness direction (z axis direction) of the transparent plate 10 to produce a vertically symmetrical structure. Therefore, in the x axis direction, the position P2 at which the light emits via the second surface 10B is equal to the position P1 at which the light enters the first surface 10A. Supposing that the temperature dependence of the product (nΛ) in Equation (20) above no longer exists, because there is no temperature dependence of the position P1 at which the light enters the first surface 10A, the Bragg condition is always satisfied irrespective of the temperature and there is therefore no longer any temperature dependence of the position P2 at which the light emits via the second surface 10B. Therefore, if the temperature dependence of the product (nΛ) constituting the temperature dependence component in Equation (20) above is reduced, not only is it possible to diminish the temperature dependence of the diffraction angle, the temperature dependence of the emitting position P2 can also be reduced.

Figure 11:
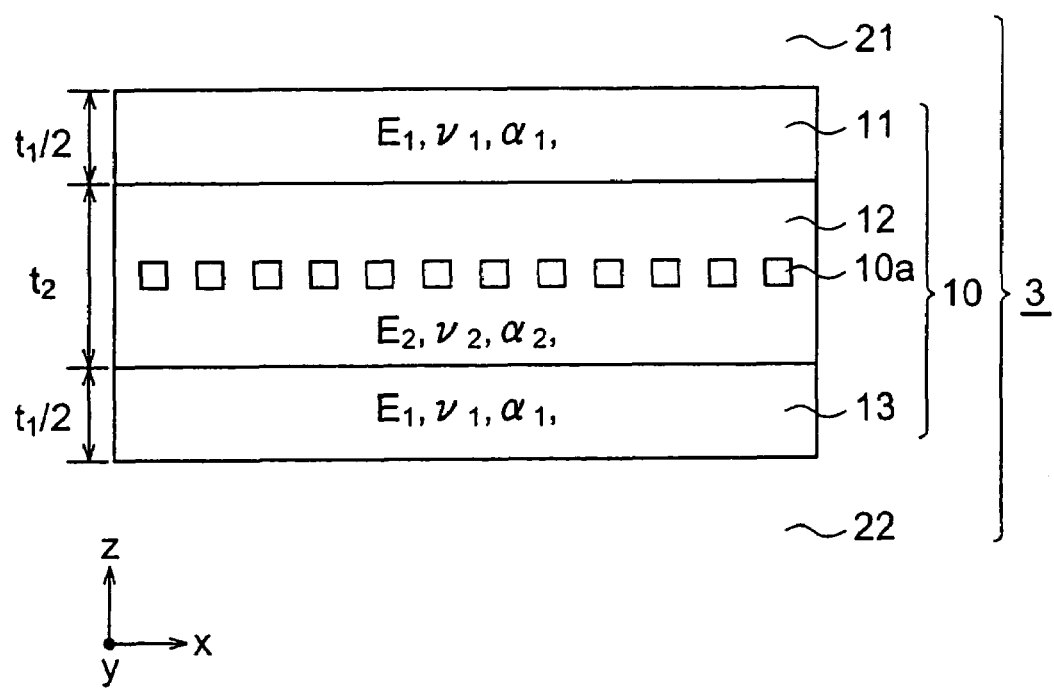
FIG. 11 is a sectional view of a diffraction grating element 3 relating to the embodiment.

FIG. 11 is a sectional view of a diffraction grating element 3 according to the embodiment. The diffraction grating element 3 shown in this figure is a modified example of the diffraction grating element 2 mentioned earlier, the transparent plate 10 thereof being constituted by sequentially laminating the three optical glasses 11 to 13. The three optical glasses 11 to 13 of the diffraction grating element 3 are similar to the constitution shown in FIG. 5. The optical glass 12 at the center is silica glass, for example, and the optical glasses 11 and 13 on either side thereof are each made of silica glass to which the element Ge or Ti, for example, has been added. The diffraction grating 10a is formed at the center in the thickness direction (z axis direction) of the central optical glass 12, is a vertically symmetrical structure, and is formed cyclically at the period Λ in the x axis direction with the grating direction parallel with the y axis. In addition, a reflection reduction film is suitably provided on the surface of the optical glasses 11 and 13 respectively. So too in the case of the diffraction grating element 3, the linear expansion coefficient α of the period Λ of the diffraction grating satisfies any of Equations (5) to (8) above when the diffraction grating element is placed under atmospheric pressure, or satisfies Equation (18a) or (18b) above when the diffraction grating element is hermetically sealed. Similarly to the diffraction grating element 2 mentioned earlier, with the diffraction grating element 3, if the temperature dependence of the product (nΛ) is diminished, the temperature dependence of the diffraction angle is reduced and the temperature of the emitting position is also reduced.

The diffraction grating elements 2 and 3 are produced as detailed below. Another transparent glass that is smooth on both surfaces is pasted onto the diffraction grating surface of transparent glass in whose surface the diffraction grating is formed by etching or similar. The transparent plate 10 of the diffraction grating element 2 or the optical glass 12 of the diffraction grating element 3 is glued together. Alternatively, the surface of the diffraction grating surface of the transparent glass in which the diffraction grating is formed by etching or similar has a grating groove that is embedded by means of a high refractive index material such as $TiO_2$, $Ta_2O_5$, or $Nb_2O_5$ by means of vapor deposition and then another transparent glass that is smooth on both surfaces is pasted onto the diffraction grating side. The transparent plate 10 of the diffraction grating element 2 or the optical glass 12 of the diffraction grating element 3 may be glued together. In the latter case, because the whole of the diffraction grating side is solid, the pasting work is straightforward. Further, in the latter case, when a surface treatment such as grinding is performed after the embedding by means of a high refractive index material, the pasting work is even easier and hence suitable.

Figure 12:
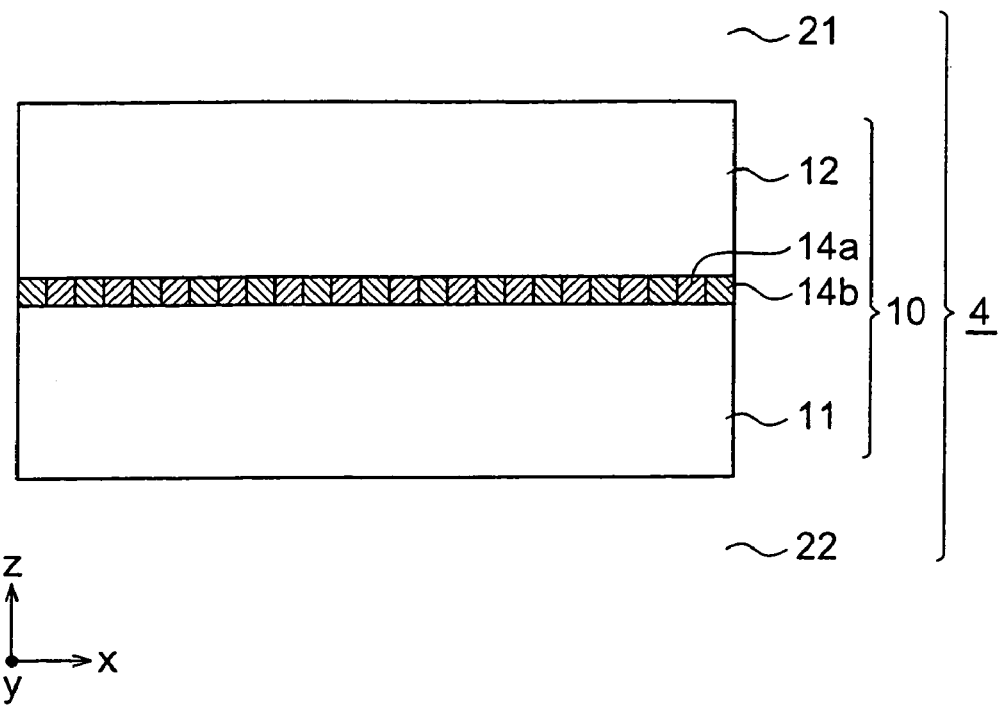
FIG. 12 is a sectional view of a diffraction grating element 4 relating to the embodiment.

FIG. 12 is a sectional view of a diffraction grating element 4 according to this embodiment. In the diffraction grating element 4 shown in this figure, the transparent plate 10 has a diffraction grating that is formed in a region interposed between the optical glass 11 and the optical glass 12. This diffraction grating is constituted such that a medium 14$a$ and a medium 14$b$ are provided alternately at the period $\Lambda$ in the x axis direction.

Figure 13:
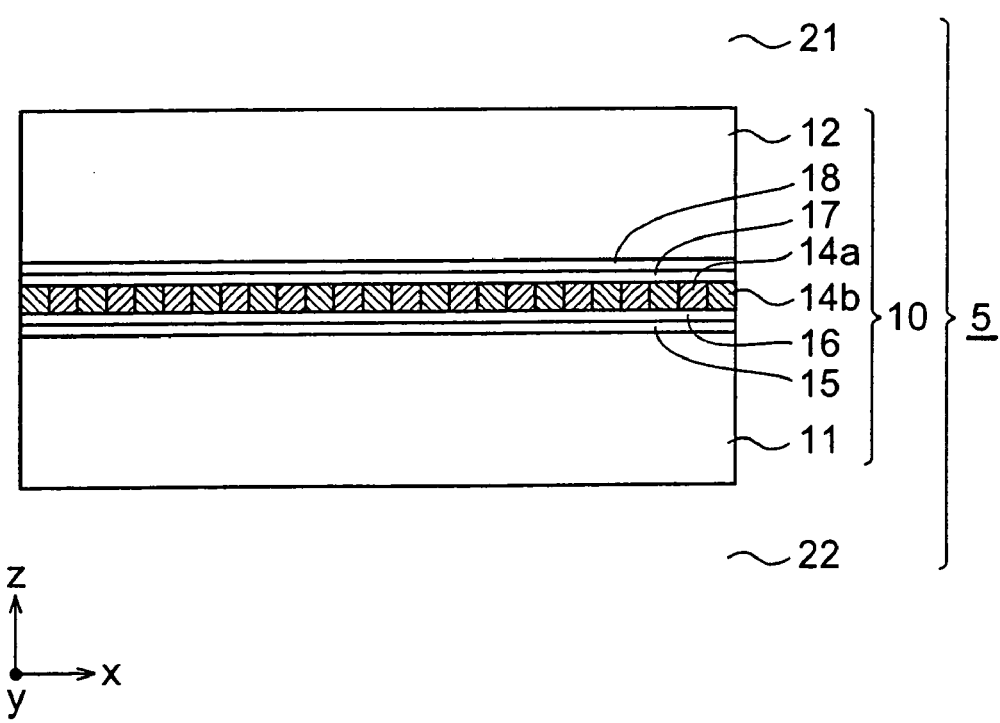
FIG. 13 is a sectional view of a diffraction grating element 5 relating to the embodiment.

In addition, FIG. 13 is a sectional view of a diffraction grating element 5 relating to this embodiment. In the diffraction grating element 5 shown in this figure, the transparent plate 10 comprises films 15 to 18 that are sequentially formed in regions that are interposed between the optical glass 11 and the optical glass 12, and comprises a diffraction grating that is formed between the films 16 and 17. This diffraction grating is constituted such that the medium 14$a$ and 14$b$ are provided alternately at the period $\Lambda$ in the x axis direction.

So too with these diffraction grating elements 4 and 5, the linear expansion coefficient $\alpha$ of the period $\Lambda$ of the diffraction grating satisfies any of Equations (5) to (8) above when the diffraction grating elements are placed under atmospheric pressure. Alternatively, the linear expansion coefficient $\alpha$ satisfies Equation (18a) or (18b) above when the diffraction grating elements are hermetically sealed. Similarly to the diffraction grating element 2 mentioned earlier, with these diffraction grating elements 4 and 5, if the temperature dependence of the product (n$\Lambda$) is diminished, the temperature dependence of the diffraction angle is reduced and the temperature dependence of the emitting position is also reduced.

The diffraction efficiency of these diffraction grating elements 4 and 5 can also be improved in a broader wavelength band. Further, the polarization dependence of the diffraction grating elements 4 and 5 can be suppressed and, because there is therefore no need to provide a polarization separation element or polarization composing element, or the like, separately from the diffraction grating element, it is possible to remove the influence exerted by the temperature dependence of the polarization separation and composing of this polarization separation element or polarization composing element, or the like.

Further, in the case of the diffraction grating element 5, in a normal case, because the films 15 to 18 and the medium 14$a$ and 14$b$ are adequately thin and hardly affect the linear expansion coefficient of the transparent plate 10, these parts need not be vertically symmetrical.

A description was provided above for the suppression of the temperature dependence of a diffraction grating element unit. Incidentally, generally speaking, the diffraction grating element is sometimes used together with other optical elements. For example, when the polarization state of the incident light is not constant, the diffraction grating element is used together with a polarization separation element, a polarization rotation element and a polarization composing element. In this case, the incident light is polarization-separated by the polarization separation element to produce two linear polarized light components whose polarization planes are orthogonal to one another. Of the light of the two linear polarized light components that have been polarization-separated, one polarization plane is rotated by the polarization rotation element through 90° to render linear polarized light with the same orientation, and then enters the diffraction grating element before being diffracted. Of the light of the two linear polarized light components that is diffracted by the diffraction grating element, one polarization plane is rotated by another polarization rotation element through 90° to produce linear polarized light whose polarization planes are orthogonal to one another, and the light is then subjected to polarization composing by the polarization composing element before being emitted.

In such a case, in addition to the temperature dependence being suppressed in diffraction grating element, the other optical elements (polarization separation element, polarization composing element, and the polarization rotation element) are generally also temperature-dependent and hence a temperature control mechanism is required. However, when the temperature control load is large for the other optical elements, the significance of dispensing with or simplifying the temperature control mechanism is reduced for the diffraction grating element.

Therefore, the diffraction grating element 1 relating to this embodiment is suitably a diffraction grating element whose temperature dependence is suppressed and in which the polarization dependence of the diffraction efficiency is also suppressed. Accordingly, even when the polarization state of the incident light is not constant, the incident light can be diffracted with constant diffraction efficiency by the diffraction grating element 1 alone without using the other optical elements mentioned above (the polarization separation element, the polarization composing element, and the polarization rotation element).

Figure 14:
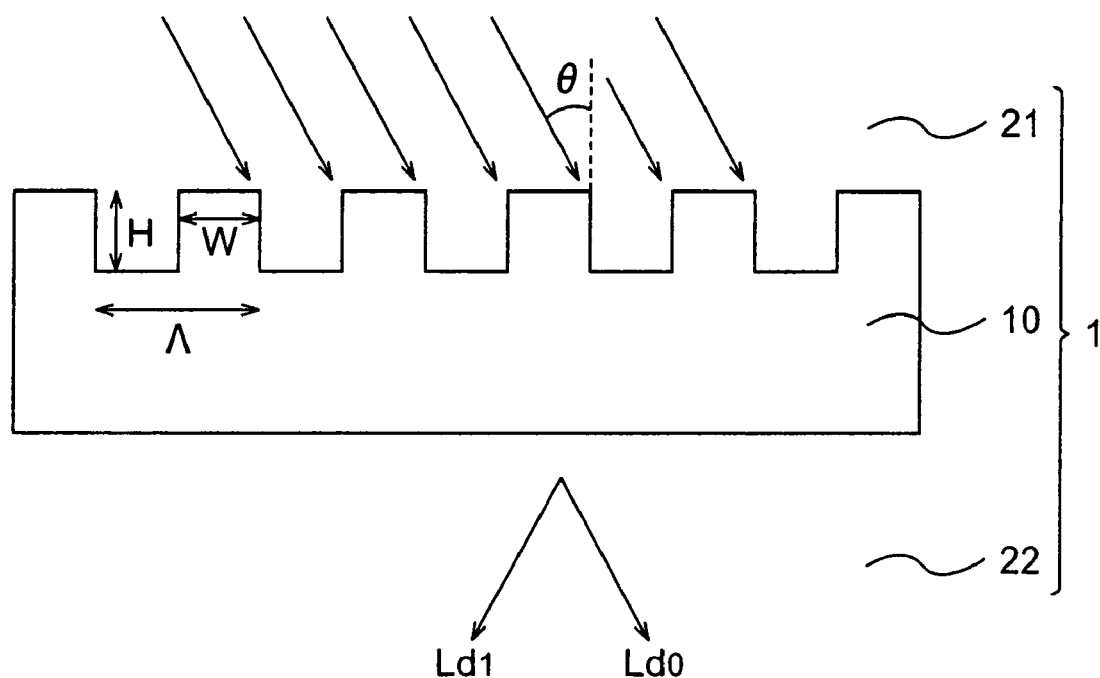
FIG. 14 illustrates a method of implementing the polarization independence of the diffraction grating element 1 relating to the embodiment.

FIG. 14 illustrates a method of implementing the polarization independence of the diffraction grating element 1 relating to this embodiment. FIG. 14 shows 0 order diffracted light $Ld_0$ and first order diffracted light $Ld_1$. For example, let us suppose that, as shown in FIG. 14, the cross-section of the diffraction grating has rectangular recesses and protrusions, that the period $\Lambda$ is 1.55 µm, the height H of the protruding strips is 3.72 µm, and the ratio (W/$\Lambda$) between the width W of the protruding strips and the period $\Lambda$ is 0.66. Suppose that the transparent plate 10 consists of silica glass and that the medium 21 and 22 are air. Further, let us assume that a non-reflective coating is formed on the second surface 10B of the transparent plate 10. Here, supposing that the wavelength of the light entering the first surface 10A from the medium 21 is 1.55 µm and the angle of incidence $\theta$ is 30°, the diffraction efficiency of the TE polarized light and the TM polarized light is then on the order of 98% and the diffraction efficiency is substantially polarization-independent.

The principles of the present invention have been illustrated and described in the preferred embodiments, but it is apparent to a person skilled in the art that the present invention can be modified in arrangement and detail without departing from such principles. We, therefore, claim rights to all variations and modifications coming with the spirit and the scope of claims.

The invention claimed is:

1. A diffraction grating element, comprising:
   a transparent plate having a first surface and a second surface that are substantially parallel with one another, and the transparent plate doped with an impurity; and
   a diffraction grating which is formed on a first surface side with respect to the second surface and is substantially parallel with the first surface,
   wherein:
   the diffraction grating element is disposed in air; and
   the rate of change in the period per unit length of the diffraction grating with respect to a temperature change is from $0.65 \times 10^{-6}$/K to $1.11 \times 10^{-6}$/K.

2. The diffraction grating element according to claim 1, wherein the diffraction grating is formed on the first surface.

3. The diffraction grating element according to claim 1, wherein the diffraction grating is supported by the first surface.

4. The diffraction grating element according to claim 1, wherein the diffraction grating is formed within the transparent plate.

5. The diffraction grating element according to claim 1, wherein the transparent plate is made of silica glass to which an impurity has been added.

6. The diffraction grating element according to claim 5, wherein the impurity is any element among Ge, P and B.

7. The diffraction grating element according to claim 1, wherein the transparent plate is constituted by laminating a plurality of optical glasses with different linear expansion coefficients.

8. The diffraction grating element according to claim 7, wherein the section of the transparent plate where the diffraction grating is formed is made of silica glass.

9. The diffraction grating element according to claim 7, wherein the distribution of material in the thickness direction of the transparent plate is symmetrical.

10. The diffraction grating element according to claim 9, wherein the diffraction grating is formed in the center in the thickness direction of the transparent plate.

11. The diffraction grating element according to claim 1, wherein the diffraction efficiency is substantially polarization-independent.

12. The diffraction grating element according to claim 1, wherein the rate of change in the period per unit length of the diffraction grating with respect to a temperature change is from $0.80 \times 10^{-6}$/K to $0.95 \times 10^{-6}$/K.

* * * * *